Patented Apr. 25, 1939

2,156,126

UNITED STATES PATENT OFFICE 2,156,126

RESIN PRODUCTION

Joseph Rivkin, Pittsburgh, Pa., assignor to The Neville Company, a corporation of Pennsylvania No Drawing. Application July 9, 1936, Serial No. 89,847

12 Claims. (Cl. 260—81)

This invention relates to the production of resins, and particularly to the production of resins formed by a reaction involving the polymerizable reactives occurring in hydrocarbon liquids and phenolic substances, to give a modified resin possessing solubility in the solvent alcohols. More specifically, the invention relates to improvements upon the method primarily disclosed in German Patent No. 302,543, issued November 8, 1919, to Ruetgerswerke Aktiengesellschaft.

In accordance with the disclosure of that patent, I subject a reaction mixture of a polymerizable-containing hydrocarbon liquid and a phenolic substance to the reactivating effect of a catalyst consisting of sulphuric acid, or sulfonic acids, particularly phenol sulfonic acids.

My invention resides in so controlling the resin-producing reaction, and so proportioning the ingredients, and in so conducting the procedure of recovering resinous products, that I am able to obtain a resin of improved alcohol solubility, while obtaining a good yield of resinous products, under economical operating conditions.

In my procedure, I may utilize any type of reaction vessel or apparatus known to be suitable for conducting reactions of this sort. Such known suitable vessels, or apparatus, are those designed for effective dispersion of the catalyst in the reactive liquid or blend, either by direct propeller agitation or by circulation, and which provide for temperature control by circulation of a heat-transferring fluid through channels such as coils, a jacket, or a heat exchanger arrangement. Into this vessel, or apparatus, I introduce a reaction mixture, which may be mixed in advance, or the ingredients of which may be separately introduced into the vessel. The reaction mixture comprises a hydrocarbon liquid, which carries the polymerizable bodies naturally occurring therein. In the crude solvent naphthas, having their initial origin in coal, the polymerizable bodies are predominately of the coumarone-indene type, or of the dicyclopentadiene type, in accordance with the proximate source from which the naphthas are derived. With such polymerizable-containing hydrocarbon liquid, or mixture of liquids, I associate a phenolic substance, such as a phenol, a phenolic acid, or other aromatic compound which contains one or more hydroxyl groups attached to the organic nucleus, or the homologues and substitution products of such aromatic compounds. I then promote reaction in the reaction mixture by the addition of a catalyst of the class hereinabove defined.

The reaction promoted by the catalyst is permitted to proceed under heat-abstracting conditions, as the heat of reaction tends to produce a temperature rise. During the reaction period I maintain the temperature of the reaction mixture below 60° C., and most desirably within the temperature range of 25° C. to 35° C. The reaction apparently consists in a polymerization of the hydrocarbon-contained polymerizables, accompanied by a phenolic involvement, in which the phenolic substance reacts with the bodies naturally occurring in the hydrocarbon in one or more of their molecular stages. The resultant reaction product consists of a resinous mass which is separable into a hard resin, and into a soft resin. In most instances the soft resin is fluid at normal room temperature. Both the hard and soft resins are soluble in the solvent alcohols, such, for example, as ethanol, isopropanol, methanol, and butanol. Both resins possess, inherently, compatibility with nitrocellulose, and the soft resin has an inherent tendency to dissolve cellulose acetate. An additional product resultant from the reaction is a solvent naphtha refined by the resin-forming reaction.

As to the proportion of the catalyst used, I have found the proportions given in Ruetgerswerke German Patent No. 302,543 substantially suitable. Thus, if we take a 500 gram test blend, comprising 390 grams of No. 2 crude solvent naphtha, which contains polymerizables of the coumarone-indene type, and 110 grams of cresol, I have found from 2.5 grams to 15 grams of concentrated sulphuric acid, or from 20 grams to 30 grams of cresol-sulphonic acid adequate to promote the resin-forming reactions. It is, however, to be understood that the proportional quantity of the catalyst used may be varied within wide limits. In this reaction mixture or blend the crude solvent naphtha contained 60% polymerizables, which may be considered standard content in the polymerization of coumarone and indene.

I have found that the proper basis for proportioning the phenolic content of the blend and the hydrocarbon-contained polymerizables is on the basis of the content of the latter in the hydrocarbon liquid in which they occur. For example, I have found it desirable to include from 12% upward by weight of the phenolic substance as compared with the weight of the total blend of phenolic substance and crude solvent naphtha on the basis of a 60% content of polymerizables in the crude solvent naphtha. For example, as given above, the cresol is equal to 47% the weight of 60% the weight of crude solvent naphtha, and otherwise stated it is 22% of the total blend of crude solvent naphtha and cresol. Stating the desirable phenolic minimum in terms of the polymerizable content, the phenolic inclusion is desirably not substantially less than 22% the weight of the polymerizables.

Fundamentally considered, I so conduct my reaction that the conditions are particularly favorable to phenolic involvement in the reaction. Factors rendering the conditions favorable to phenolic involvement are the high percentage of phenolic substance used, and temperature control. I have found as a general relationship that by utilizing relatively great percentage quantities of phenol, and maintaining the reaction temperature relatively low, I obtain resins of increased alcohol solubility. If one of the more reactive phenolic substances, such as cresol, or the like, be used, a reaction period of four hours has been found adequate. If the phenolic reagent is one which is less reactive, such, for example, as chlorocresol, it is desirable to dissolve the catalyst in the phenolic content and to carry out the reaction by a slow addition of the naphtha to the thus activated phenolic content of the reaction mixture.

In conducting my process, I prefer to use one of the more commercially available and economical phenols, such as cresol, phenol, or xylenol, since they are of relatively low cost, and because their use simplifies the conduct of the reaction.

By following the above described procedure, I obtain resinous products, both hard and soft, which have particularly good alcohol solubility, and which are produced in good yield. Both the hard resin and the soft resin are usable in lacquers and the like, because of their alcohol solubility and compatibility with nitrocellulose. The resins also have the quality of gel-retardance with China-wood oil, having a mild effect in preventing gas-checking, and having antiskinning qualities as included in coating compositions. Whereas I speak of hard resin and a soft fluid resin, it should be understood that these resins are both potentially present in the reactive blend, and that, as resin is recovered from the reactive blend, they are present in the form of a single, relatively soft, resinous body, subject to selective separation into resins of different melting-point, and different consistency at normal room temperature.

As the resinous products occur in solution in the carrying hydrocarbon liquid, in which reaction has taken place, this liquid contains traces of acid from the unspent portion of the catalyst. In accordance with usual procedure, this acid may be neutralized by means of an alkaline solution, which is then washed from the reacted blend. The refined solvent is distilled away from the resin, and the soft fluid resin may be separated from the higher melting portion of the product by steam distillation.

As the term "crude solvent naphtha" is used herein, it is to be understood as defining those primarily aromatic hydrocarbon liquids which contain polymerizables, and is not strictly to be limited to a specialized type of such hydrocarbon liquids. For example, drip oil may be considered as a crude solvent naphtha of the type which contains preponderantly polymerizables of the coumarone and indene type, although it also contains styrene polymerizables in substantial quantity.

Taking a crude solvent naphtha containing dicyclopentadiene as its preponderant polymerizable content, I have produced a mixed reaction involving those polymerizables and a phenolic reagent, as products of which reaction I recovered hard resin which is alcohol soluble and a fluid resin having, when heated, solvent power upon cellulose acetate. This reaction I conducted in accordance with the conditions given above, making a reaction mixture of the naphtha and phenolic reagents on the basis of a weight of the phenolic reagent in excess of 22% the weight of the polymerizables in the naphtha. To promote reaction I have used the catalysts noted above. Similarly, I maintained the reaction temperature below 60° C.

It is to be, of course, understood that I may, in the manner of the Ruetgerswerke patent, take as my hydrocarbon starting material a hydrocarbon liquid which initially contains phenolic reactives, adding phenolic substances in accordance with the proper phenolic content of the blend.

I may state, as a general proposition, that cresol is a highly desirable material insofar as my process is concerned. It is a low cost and effective phenolic reagent, and cresol sulphonic acid is a catalyst which may readily be prepared from it. It is, therefore, to be given preference in commercially conducting my process, although phenol also complies with the economy factors involved in commercially conducting the process.

This is a continuation in part of my co-pending application Serial No. 55,613, filed December 21, 1935, now Patent No. 2,098,361, granted Nov. 9, 1937.

I claim as my invention:

1. That method of producing resins as the product of reaction involving the resin-forming polymerizable constituents of crude solvent naphtha and a phenolic reagent, which comprises the steps of treating said crude solvent naphtha in the presence of a phenolic reagent reactive with said constituents and present in an amount not substantially less than 22 per cent by weight of said constituents, with a polymerization catalyst of the group consisting of concentrated sulfuric acid and sulfonic acids, while agitating and maintaining the reaction mixture below about 60° C., thereby effecting polymerization of said constituents and reaction with said reagent with production of resin readily soluble in alcohols, and recovering and separating the reaction products and the solvent naphtha refined by such treatment.

2. The herein described method of producing resins in accordance with the procedure of claim 1 in which the phenolic reagent included in the reaction mixture is cresol.

3. The herein described method of producing resins in accordance with the procedure of claim 1 in which the catalyst is cresol-sulphonic acid.

4. That method of producing resins as the product of reaction involving the polymerizable coumarone and indene constituents of crude solvent naphtha and a phenolic reagent, which comprises the steps of treating said crude solvent naphtha in the presence of a phenolic reagent reactive with said coumarone and indene constituents and present in an amount not substantially less than 22 per cent by weight of said constituents, with a polymerization catalyst of the group consisting of concentrated sulfuric acid and sulfonic acids, while agitating and maintaining the reaction mixture below about 60° C., thereby effecting polymerization of said coumarone and indene constituents and reaction with said reagent with production of resin readily soluble in alcohols, and recovering and separating the reaction products and the solvent naphtha refined by such treatent.

5. The herein described method of producing resins in accordance with the procedure of claim 4 in which the phenolic reagent included in the reaction mixture is cresol.

6. The herein described method of producing resins in accordance with the procedure of claim 4 in which the catalyst is cresol-sulphonic acid.

7. A method in accordance with claim 1 in which the temperature of the reaction mixture is maintained between about 25° to 35° C.

8. A method in accordance with claim 4, the temperature of the reaction mixture being maintained between about 25° to 35° C.

9. In a method of producing resins from the polymerizable constituents of crude solvent naphtha by polymerization and reaction thereof with a phenolic reagent reactive therewith, that combination of steps comprising adding said crude solvent naphtha progressively to a preformed mixture of said phenolic reagent and a polymerization catalyst of the group consisting of concentrated sulfuric acid and sulfonic acids, the phenolic reagent constituting not substantially less than 22% by weight of the total constituent, while agitating and maintaining the reaction mixture below about 60° C., thereby effecting polymerization of said constituents and reaction with said reagent with production of resin readily soluble in alcohols, and recovering and separating the reaction products and the solvent naphtha refined by the reaction.

10. A method in accordance with claim 9, the temperature of the reaction mixture being maintained between about 25° to 35° C.

11. A method in accordance with claim 9 in which the phenolic reagent is a cresol.

12. A method according to claim 1, the catalyst being a phenol sulfonic acid.

JOSEPH RIVKIN.